United States Patent [19]

Darr et al.

[11] Patent Number: 5,735,417
[45] Date of Patent: Apr. 7, 1998

[54] CONTAINER CLOSURE LOCKING ASSEMBLY

[75] Inventors: Richard C. Darr, Medina, Ohio; Craig A. Larson, Howell, Mich.

[73] Assignee: Plastipak Packaging, Inc., Plymouth, Mich.

[21] Appl. No.: 761,760

[22] Filed: Dec. 5, 1996

[51] Int. Cl.⁶ .................................................. B65D 55/02
[52] U.S. Cl. ........................... 215/216; 215/44; 215/218; 215/221; 215/330; 215/331
[58] Field of Search ........................... 220/281; 215/43, 215/44, 321, 216, 217, 218, 221, 329, 330, 331, 335

[56] References Cited

U.S. PATENT DOCUMENTS

| | | |
|---|---|---|
| 4,061,239 | 12/1977 | Tasseron . |
| 4,144,983 | 3/1979 | Pauls et al. ............................ 215/216 |
| 4,387,819 | 6/1983 | Corsette . |
| 4,649,068 | 3/1987 | Collette ............................ 215/44 X |
| 4,742,927 | 5/1988 | Tierney et al. ........................... 215/216 |
| 4,865,209 | 9/1989 | Buxh ............................ 215/216 |
| 5,105,961 | 4/1992 | Noren et al. . |
| 5,230,433 | 7/1993 | Hamilton et al. ........................ 215/221 |
| 5,314,084 | 5/1994 | Folta et al. . |
| 5,456,376 | 10/1995 | Luch et al. . |
| 5,462,181 | 10/1995 | Glynn . |
| 5,462,182 | 10/1995 | Opresco . |
| 5,586,671 | 12/1996 | Thomas et al. ........................ 215/221 X |

FOREIGN PATENT DOCUMENTS

1456216   11/1976   United Kingdom ................ 215/209

*Primary Examiner*—Allan N. Shoap
*Assistant Examiner*—Robin A. Hylton
*Attorney, Agent, or Firm*—John P. Guenther

[57] ABSTRACT

A container closure locking assembly (40) includes a plastic container (42) having a body portion (54) for holding the contents, a lower closed end (56) for supporting the container (42), and an upper dispensing end (58). The upper dispensing end (58) includes a neck (60) and a round dispensing spout (64) having a central axis (A). The dispensing spout (64) extends upwardly from the neck (60) and further includes an external closure thread (68), a retaining flange (70), and a rotational positioning formation (72). A plastic lock ring (44) molded separately from the container (42) extends around and is supported by the neck (60) of the upper dispensing end (58) of the container (42) below the external closure threads (68) of the dispensing spout (64). The lock ring (44) includes retainers (82 and 84) to secure the lock ring (44) to the container (42) and at least one external lock (98) having a lock surface (100) and an unlocking actuator (102) for moving the lock surface (100) radially inward with manual movement. The lock ring (44) also includes a rotational positioning formation (96) to rotatively position the lock ring (44) about the central axis (A) of the dispensing spout (64). A closure (46) having an internal thread (110) is threaded onto the external thread (68) of the dispensing spout (64) of the container (42) to secure the closure (46) and close the container (42). The closure (46) has at least one internal lock (112) designed to engage the outer curved ramp surface (100) of the external lock (98) of the lock ring (44) to prevent unthreading rotation of the closure (46) from the dispensing spout (64). The lock surface (116) of the internal lock (112) of the closure (46) may be disengaged from the lock surface (100) of the external lock (98) of the lock ring (44) by inward manual movement of unlocking actuators (102).

27 Claims, 7 Drawing Sheets

CONTAINER CLOSURE LOCKING ASSEMBLY

TECHNICAL FIELD

This invention relates to a container closure locking assembly for use in the container industry.

BACKGROUND ART

Because a significant number of common household containers have contents which should not be readily accessible to all persons, container and closure manufacturers have made efforts to design packaging that restricts undesired access. Typically, such container closure assemblies require some type of manual manipulation of the closure device, the dispensing end of the container, or both, in order to permit access to the container contents.

Attempts have been made in the prior art to provide a container closure locking assembly to restrict undesired access. Two-piece closures, or caps, are quite well known in the art. A common form of the two-piece closure comprises a threaded inner closure surrounded by an outer shell that freely rotates relative to the inner closure unless it is forcibly manipulated to permit unthreaded rotation of the cap. Unfortunately, this type of assembly is often complicated and may be very difficult for many persons to open, especially if physical strength is required.

Injection blow molding is generally performed by either a one- or a two-stage process. In the one-stage process, a preform is injection molded and transferred to a blow mold where it is blow molded prior to cooling. In the two-stage process, the preforms are injection molded and allowed to cool prior to reheating for the blow molding process.

Some companies presently produce containers having locking apparatus by the one-stage process in which the locking apparatus is formed integrally with the preform during the injection molding process. Because this type of preform is produced for the one-stage process, there is no sorting involved or need to manipulate the preform for proper orientation since that is handled during the transfer operation from the injection mold to the blow mold. Since the injection molding process is the most time-consuming step in the operation, the two-stage process is advantageous from an increased output and efficiency standpoint. However, the two-stage process necessarily involves additional sorting of preforms and positioning concerns with respect to the blow molding phase.

While the prior art discloses containers having container locks in patents such as U.S. Pat. Nos. 5,462,182, 5,462,181, 5,456,376, 5,105,961, 5,314,084, 4,387,819, and 4,061,239, there exists a need for an improved container closure locking assembly which can be manufactured using the higher-output, two-stage process while providing an acceptable level of protection from undesired access to the container contents.

DISCLOSURE OF INVENTION

An object of this invention is to provide an improved container closure locking assembly.

In carrying out the above object, a container closure locking assembly constructed in accordance with the invention includes a plastic container having a body portion for holding the container contents, a lower closed end for supporting the container, and an upper dispensing end. The upper dispensing end includes a neck and a round dispensing spout having a central axis. The dispensing spout extends upwardly from the neck and includes an external closure thread, a retaining flange, and a rotational positioning formation. A plastic lock ring molded separately from the container extends around and is supported by the neck of the upper dispensing end of the container below the external closure threads of the dispensing spout. The lock ring includes retainers for engaging the retaining flange of the upper dispensing end of the container and to secure the lock ring to the container. The lock ring further includes at least one external lock having an outer curved ramp surface of a radially ramped shape with respect to the central axis of the dispensing spout. The external lock has a lock surface that faces circumferentially with respect to said central axis and an unlocking actuator for manually moving the lock surface radially inward. The lock ring also includes a rotational positioning formation which is designed to engage the rotational positioning formation of the upper dispensing end of the container to rotatively position the lock ring about the central axis of the dispensing spout. A closure having an internal thread is threaded onto the external thread of the container dispensing spout to secure the closure and close the container. The closure has at least one internal lock with an inner curved ramp surface of a radially ramped shape with respect to the central axis of the dispensing spout designed to engage the outer curved ramp surface of the external lock of the lock ring. The internal lock of the closure also includes a circumferentially facing lock surface for engaging the circumferentially facing lock surface of the external lock of the lock ring to prevent unthreading rotation of the closure from the dispensing spout. The lock surface of the internal lock of the closure may be disengaged from the lock surface of the external lock of the lock ring by inward manual movement of unlocking actuator so as to permit the unthreading rotation of the closure.

The container is primarily composed of plastic and can be formed in a variety of monolayer or multi-layer configurations by any number of known molding processes. Such processes typically include, but are not limited to, compression molding, injection molding, extrusion blow molding, injection blow molding, stretch blow molding, coextrusion blow molding, etc. Likewise, the lock ring which is produced separately from the container, can be formed by injection molding, compression molding, or any other type of plastic molding commonly utilized to produce similar types of plastic parts.

The lock ring, as disclosed, preferably includes both upper and lower retainers which project radially inward to engage the retaining flange of the upper dispensing end of the container and generally secure the lock ring in the vertical direction along the central axis of the dispensing spout. The lower surfaces of the lower retainers are preferably inclined outwardly (relative to the central axis) in a downward direction to facilitate the assembly of the lower retainers below the retaining flange of the upper dispensing end of the container.

To further facilitate assembly with the lock ring, the retaining flange of the upper dispensing end of the container preferably has at least a portion of its outer surface inclined inwardly in an upward direction to allow for easier engagement with the lock ring. The taper of the flange can also be accompanied by an additional incremental step or steps which also may have outer edges which are inclined inwardly in an upward direction. The formation of the upper edge of the lower retainers can be designed to extend in a substantially perpendicular direction with respect to the central axis of the dispensing spout of the container to further secure the hold of the ring from upward movement.

The upper and lower retainers preferably are staggered about the central axis within the lock ring. In some instances, it may be desirable to form either the upper or lower retainers, or both, by a secondary process, such as heat stamping, following the formation of the remainder of the lock ring.

The retaining flange of the upper dispensing end of the container and the external lock of the lock ring preferably include rotational positioning formations which engage each other to prevent or impede rotational movement of the lock ring about the central axis of the dispensing spout.

As disclosed, the rotational positioning formation of the upper dispensing end of the container includes a notch and the rotational positioning formation of the lock ring includes an inwardly protruding element which is received within said notch. More specifically, the rotational positioning formation of the upper end of the container preferably includes two notches and the rotational positioning formation of the lock ring preferably includes two inwardly protruding positioning formations respectively received within said notches. It should be noted that any number of variations in the formation of the flange and lock ring can be used to rotatively secure the two components with respect to one another. For example, although typically less desirable, the flange could include protrusions of any variety of configurations and the lock ring could correspondingly be designed with notches or indentations to receive such protrusions. The rotational fitment is increased by increasing the number of such rotational positioning formations. However, because of the need to assemble the components, it is generally found to be more than sufficient to have two diametrically opposed formations. While the lock ring can certainly have any number of unlocking actuators, more than two such devices tends to become unduly complicated and excessively burdensome to a person removing the closure. A pair of unlocking actuators are preferably placed in diametrically opposed positions about the lock ring. If desired, the shape of the container may be recessed inwardly near the vertical position of the unlocking actuators along the direction of the central axis to allow for additional mechanical movement in an inward direction. Additionally, the outer radial surface of the unlocking actuators may be textured in a variety of configurations to facilitate manually-activated movement.

If desired, the positioning of the lock ring with respect to the external threads of the container can be located so that when the closure is fully threaded onto the threads in engagement with the internal locks of the lock ring, the lower portion of the closure is substantially adjacent to the upper portion of the lock ring.

As previously mentioned, the lock ring is separately injection molded and can be assembled to the upper dispensing end of the container after the formation of the container. Moreover, the assembly of the lock ring to the container can precede or follow the filling of the container with its contents. To assemble the lock ling to the container, lock ring must be positioned above the upper dispensing end of the container. The rotational positioning formations of the flange and lock ring are aligned and/or oriented. Thereafter, the lock ring is mechanically assembled to the upper dispensing end of the container by mechanically connecting, or "snapping," the retainers of the lock ring over the retaining flange. This process can be accomplished using any number of conventional techniques known in the art. Thereafter, the closure can be applied using a variety of commonplace closure machinery available in the marketplace.

By assembling the lock ring in this manner, the two stage injection blow molding process previously discussed can be effectively utilized. This provides important manufacturing advantages over container locking closure assemblies produced via the one stage process, including the capability for higher production capacities with only slight modification to the conventional injection and blow molding equipment and capping processes. For example, the two stage process allows for simplified injection mold design. Because the features of the lock ring are not pan of the injection mold, essentially the only modification to a standard preform would be the inclusion of at least one rotational positioning formation. Such a formation could be as simple as the inclusion of a notch or groove of various shapes and sizes.

It is certainly possible, although typically less desirable, to assemble the lock ring to the upper dispensing end of the preform before the preform is blow molded into the resultant container. However, because additional sorting and more careful handling of the preform would be required in order to properly transfer the preform along with the attached lock ring to the blow mold, most of the processing efficiencies described above would be lost. For example, the added sorting and handling of the preform/lock ring assembly would slow down the manufacturing process, lead to more handling damage of preforms prior to blow molding, and be more difficult to accomplish on conventional injection and blow molding equipment.

The objects, features and advantages of the present invention are readily apparent to those skilled in the art from the following detailed description of the best modes for carrying out the invention when taken in connection with the following drawings wherein like reference characters depict like elements.

BEST MODE FOR CARRYING OUT THE INVENTION

Figures 1, 2:
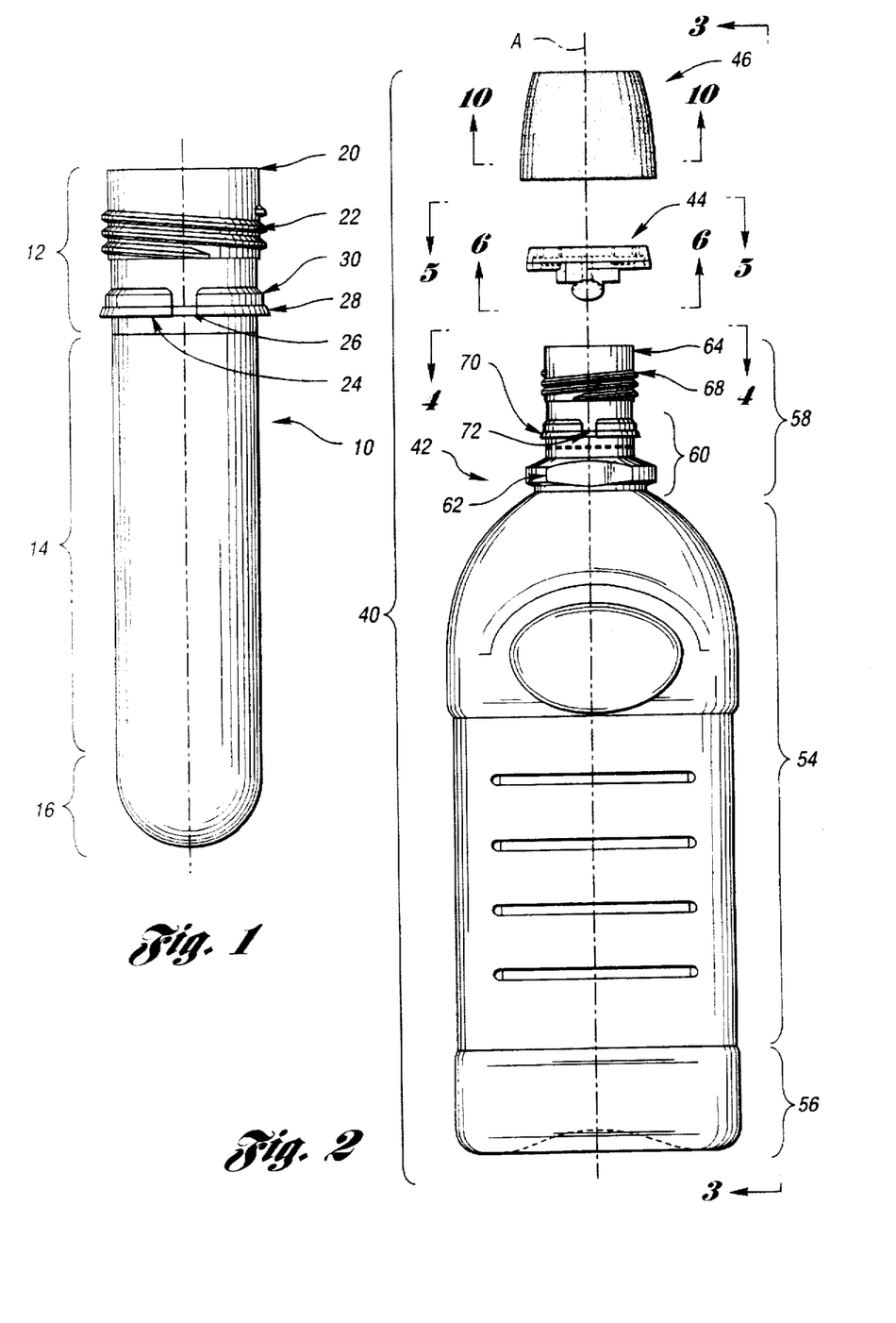
FIG. 1 is a front view of an injection molded plastic preform for blow molding of the container illustrated in this invention.
FIG. 2 is a front elevational view showing the disassembled components of the container closure locking assembly of the invention.

The preferred embodiment of the invention allows those in the art to utilize the higher-output, two-stage injection-blowmolding process. With reference to FIG. 1 of the drawings, in the preferred construction, a plastic preform 10 is formed using conventional injection molding equipment and processing techniques. The preform 10 is comprised of an open upper dispensing end 12, a body sidewall portion 14, and a lower closed end portion 16. The upper dispensing end 12 includes a round dispensing spout 20, an external closure thread 22, and a retaining flange 24, which further includes two, diametrically opposed rotational positioning formations 26 in the form of inwardly extending notches. In the preferred embodiment, the outer radial surface 28 of the retaining flange 24 is inclined in an upwardly inward direction and further includes an incremental step 30 located radially inward and above the flange which further inclines inwardly in an upward direction.

After being injection molded, the preform 10 of FIG. 1 is generally allowed to cool for a period of time and is then subsequently reheated prior to, or contemporaneously with, its transfer to a blow molding station. At the blow molding station, the preform 10 is positioned within a blow mold. A gas and/or blowing agent is then introduced inside the open end of the preform 10, which is blown into a container having a final resultant form conforming to the shape of the associated blow molds.

Figures 3, 4:
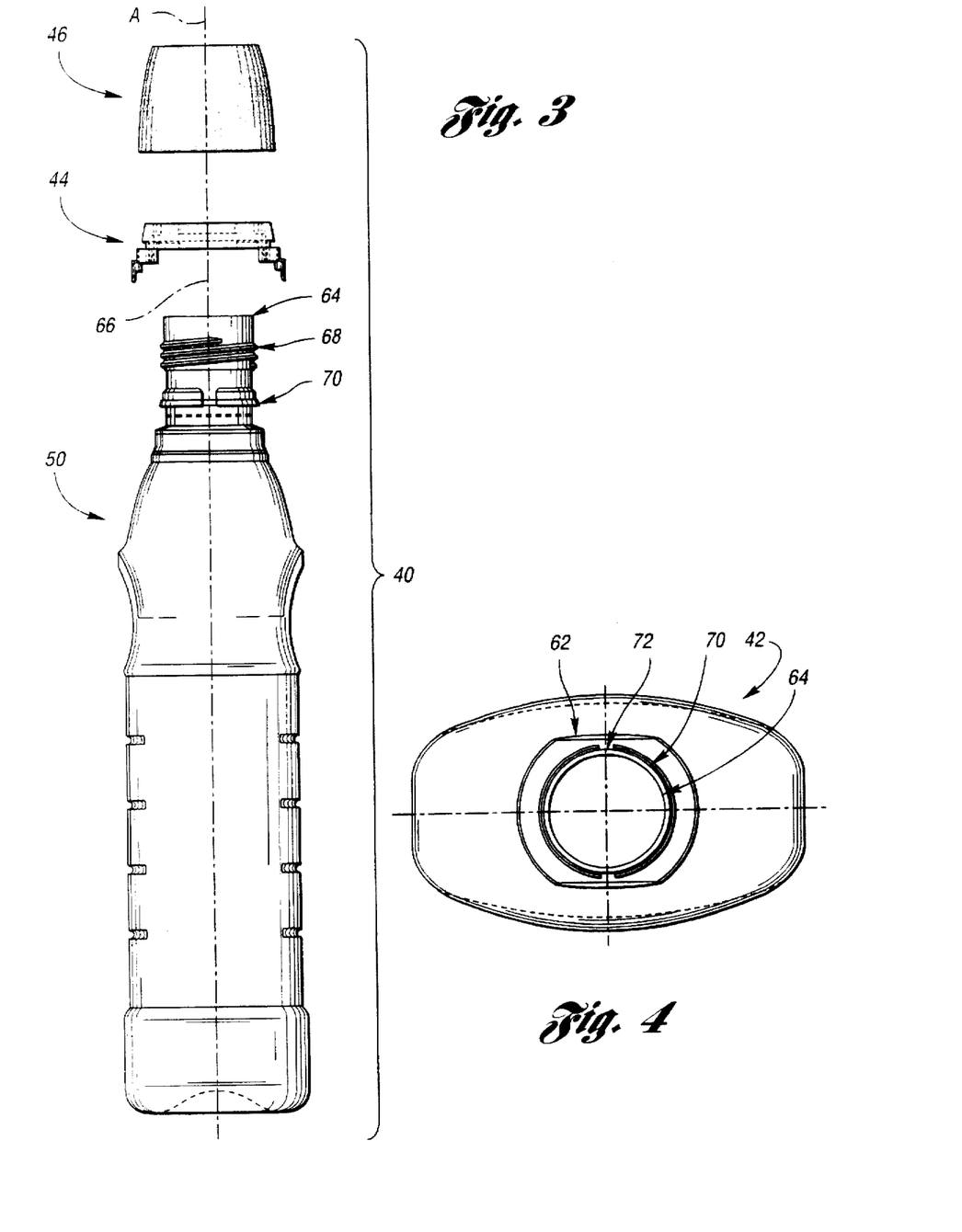
FIG. 3 is an elevational view taken along the direction of line 3—3 of FIG. 2 and shows disassembled components of the container closure locking assembly of this invention.
FIG. 4 is a top view of the container taken along the direction of line 4—4 of FIG. 2.
Figure 5:
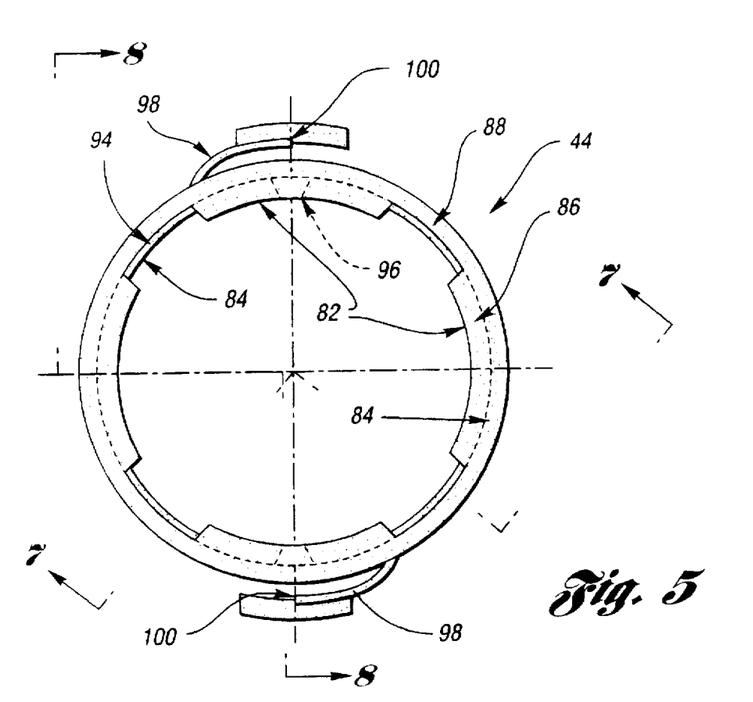
FIG. 5 is a top view of a lock ring of the locking assembly taken along the direction of line 5—5 of FIG. 2.
Figure 6:
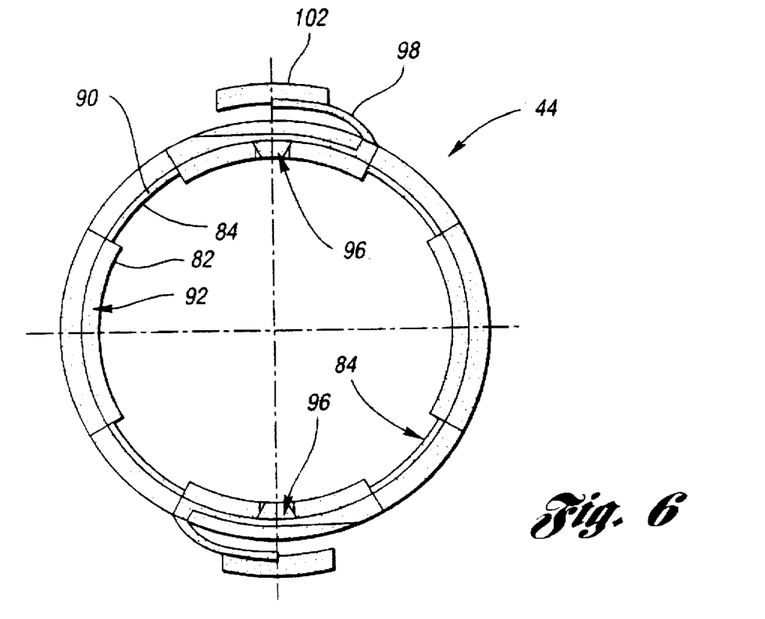
FIG. 6 is a bottom view of the lock ring taken along the direction of line 6—6 of FIG. 2.
Figure 7:
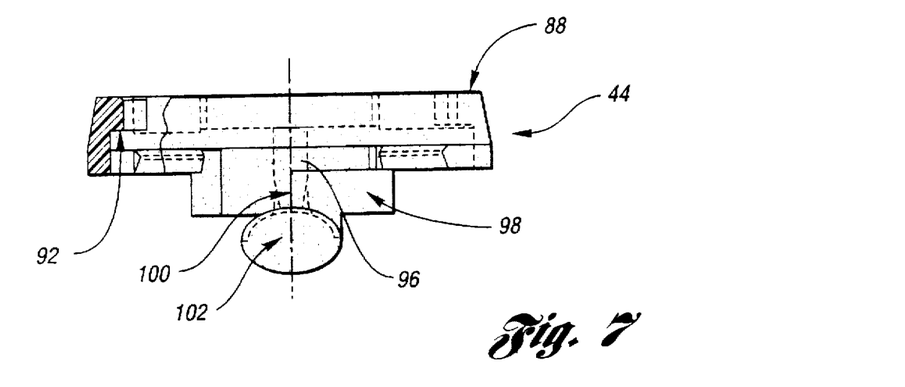
FIG. 7 is an enlarged partial sectional front view of the lock ring shown in FIG. 2 taken along the direction of line 7—7 of FIG. 5.
Figure 8:
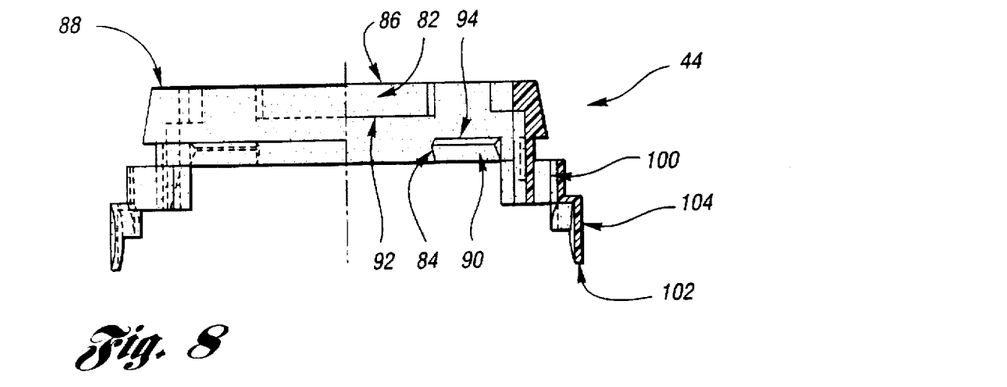
FIG. 8 is an enlarged partial sectional side view of the lock ring shown in FIG. 2 taken along the direction of line 8—8 of FIG. 5.
Figure 9:
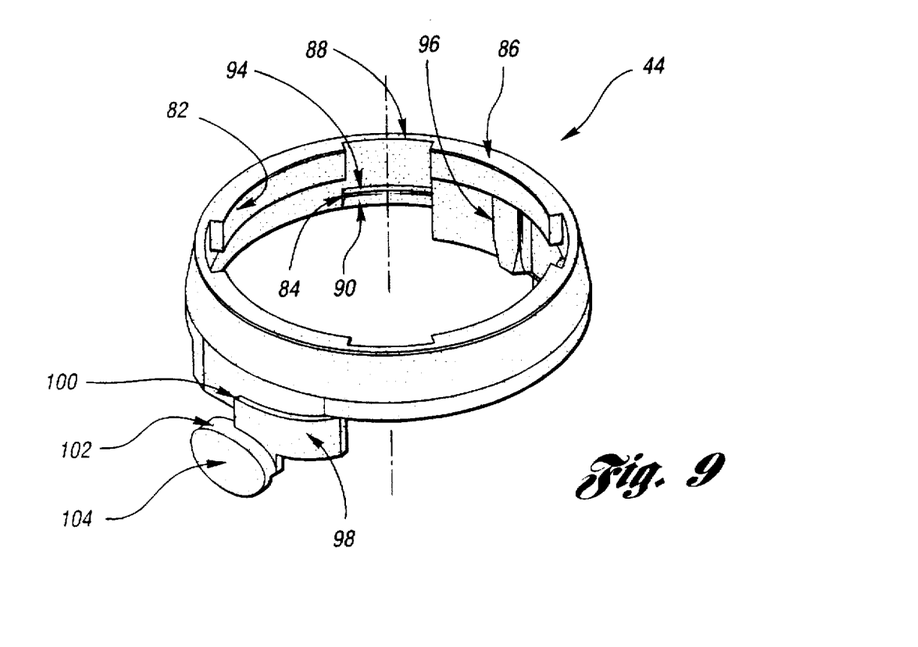
FIG. 9 is a perspective view of the lock ring shown in FIGS. 7 and 8.

FIGS. 2 and 3 show the respective front and side views of the container closure locking assembly 40, in which the container 42, lock ring 44 and closure 46 are shown disassembled. The container 42 is comprised of a body portion 54 for holding the container contents, a lower closed end 56 for supporting the container, and an upper dispensing end 58. The upper dispensing end 58 of the container 42 includes a neck 60, having two diametrically opposed indentations 62, and a round dispensing spout 64 which extends upwardly from the neck 60. The round dispensing spout 64 further includes a central axis A; an external closure thread 68; and a retaining flange 70. The retaining flange 70 also includes two, diametrically opposed rotational positioning formations 72 in the form of rectangular-shaped notches which are best observed on the container 42 shown in FIG. 4. Customarily, the upper dispensing end 58 of the container 42 would remain substantially unchanged from the upper dispensing end 12 of the preform 10 shown in FIG. 1. It is important to note that, apart from the upper dispensing end 58 which is designed to engage both the lock ring 44 and the closure 46, the overall design of the container 42 is immaterial to the functioning of the invention. As such, container 42 can take an infinite number of desired sizes, shapes and configurations. Based on conventional blow molds and blow molding equipment, the container 42 is preferably sized to hold between four ounces and one gallon of contents.

FIGS. 5, 6, 7, 8, and 9 show the lock ring 44 independently of the container closure locking assembly 40. In the preferred embodiment, the lock ring 44 is injection molded separately from the container 42 and includes a circumferentially-staggered, alternating series of four upper retainers 82 and four lower retainers 84 which project radially inward and are designed to engage the retaining flange 70 of the container 42. Although the specific number of upper retainers 82 and lower retainers 84 can vary, the preference is to have an equal number of each covering substantially the entire inner circumference of the lock ring 44 when viewed from either the top view of FIG. 5 or the bottom view of the lock ring 44 shown in FIG. 6. It is preferred that the upper surface 86 of the upper retainers 82 is substantially flush with the upper surface 88 of the lock ring 44. In the preferred embodiment, the lower surface 90 of the lower retainers 84 is inclined outwardly (in relation to the central axis A), in a downward direction to facilitate the assembly of the lock ring 44 to the retaining flange 70 of the upper dispensing end 58 of the container 42. The upper surfaces 86 and lower surfaces 92 of the upper retainers 82 and upper surfaces 94 and lower surfaces 90 of the lower retainers 84 can be altered in form to provide a more or less secure attachment to the retaining flange 70 depending on whether it is desired to physically or mechanically remove the lock ring 44 from the container 42 at a later point in time.

It is preferred that the lock ring 44 also includes two rotational positioning formations 96, in the form of protrusions, located diametrically across from one another below two of the four upper retainers 82. The two rotational positioning formations 96, or protrusions, project radially inward and are designed to fit within and engage the rotational positioning formations 72 of the retaining flange.

In its preferred form, the lock ring 44 also has two diametrically opposed external locks 98 with outer curved ramp surfaces of a radially ramped shape with respect to the central axis A. The external locks 98 include lock surfaces 100 which face circumferentially with respect to the central axis A and include two unlocking actuators 102 for moving the lock surface 100 radially inward by manual movement of the two unlocking actuators 102. If desired, the outer radial surface 104 of the unlocking actuators can be textured to provide additional friction to help facilitate the users contact therewith during their inward manual movement.

Figure 10:
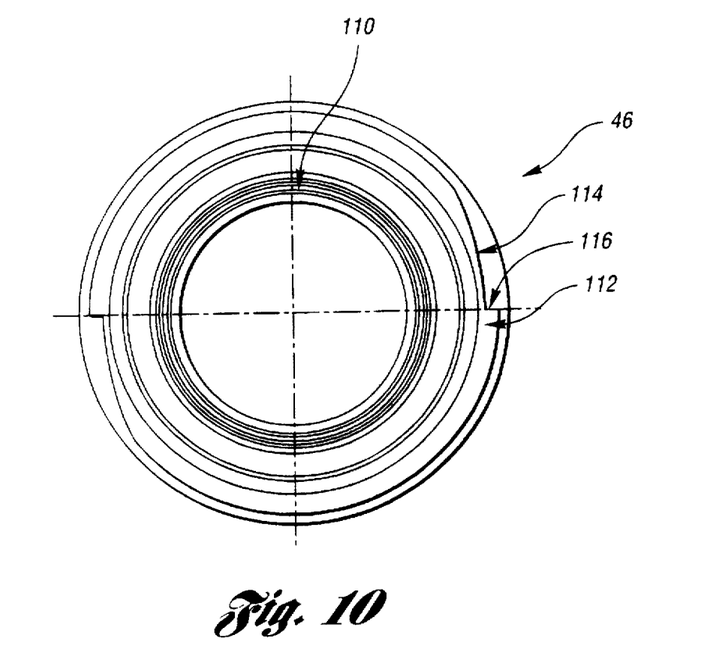
FIG. 10 is a bottom view of the closure taken along the direction of line 10—10 of FIG. 2.

With reference to FIG. 10, an injection molded closure 46 is produced to include an internal thread 110 designed to be threaded onto the external threads 68 of the upper dispensing end 58 of the container 42 to secure the contents and close the container 42. The closure 46 has two diametrically-opposed internal locks 112 having an inner curved ramp surface 114 of a radially ramped shape with respect to the central axis A. The two internal locks 112 each have internal lock surfaces 116 that face circumferentially with respect to the central axis A and engage the two lock surfaces 100 of the external lock 98 of the lock ring 44 to prevent unthreading rotation of the closure 46 from the dispensing spout 64 of the container 42. To remove the closure 46 to dispense contents from the container 42, the lock surfaces 116 of the two internal locks 112 of the closure 46 can be disengaged from the lock surfaces 100 of the two external locks 98 of the lock ring 44 by inward manual movement of the two unlocking actuators 102, thereby allowing for the unthreading rotation and removal of the closure 46.

In the normal course of assembly, a container 42 will first be blow molded from an injection molded preform 10. A lock ring 44 will be mechanically positioned above and around the round dispensing spout 64 of the container 42. With the rotational positioning formations 96 of the lock ring 44 and the rotational positioning formations 72 of the upper dispensing end 58 of the container 42 generally in alignment, the lock ring 44 is mechanically engaged, or "snapped", onto the retaining flange 70 so that the flange is generally secured between the upper retainers 82 and the lower retainers 84 of the lock ring 44 by any conventional assembly means. With the lock ring 44 generally held in place both vertically and rotatively, the container 42 is later filled with contents and the closure 46 is threaded onto the external closure thread 68 of the upper dispensing end 58 of the container 42 to close the same and seal the contents. At some point during the threading process the lock surfaces 116 of the inner locks 112 of the closure 46 will move rotatively around and engage the external locks 98 and lock surfaces 100 of the lock ring 44.

Figure 11:
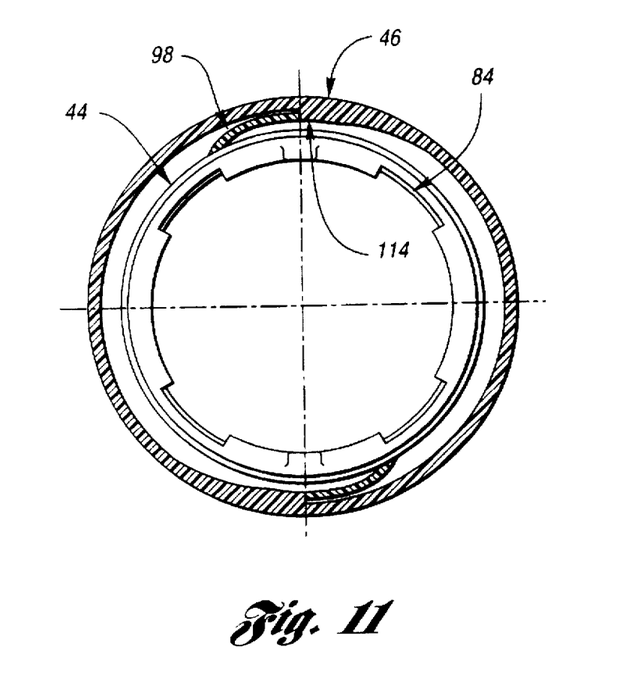
FIG. 11 is a top view of the lock ring and closure which generally shows the engagement in the locked configuration.
Figure 12:
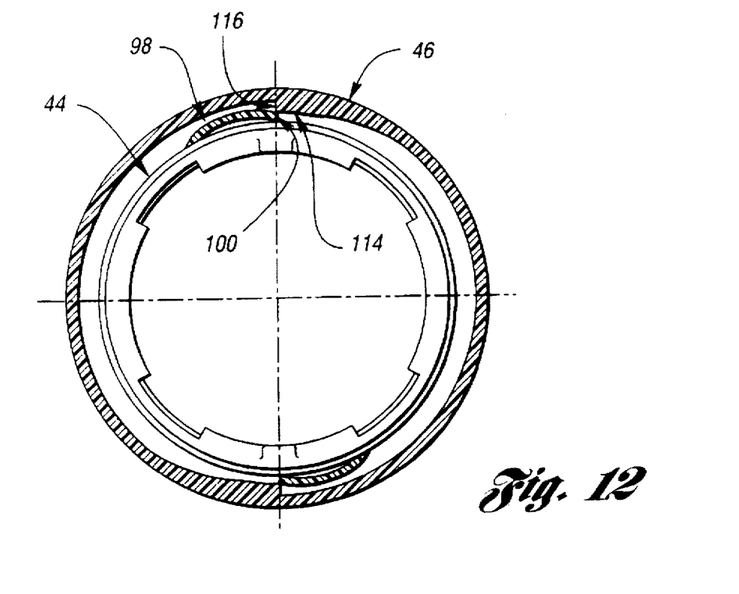
FIG. 12 is a top view of the lock ring and closure of FIG. 11 which generally shows an unlocked configuration.

The manner in which the lock ring 44 engages the closure 46 may be better understood by referring to the embodiment shown in FIGS. 11 and 12. FIG. 11 shows a top view assembly of a lock ring 44 and closure 46 in a locked configuration. To focus on the specific interaction of these elements, the container 42 has not been included in the figure. In the depicted subassembly, the flexible external lock 98 of the lock ring 44 is shown substantially engaged with the inner curved ramp surface 114 of the closure 46. It can be readily seen that, as shown, the closure 46 is physically prevented by the external locks 98 of the lock ring 44 from being unthreaded rotatively in the counterclockwise direction.

FIG. 12 shows the same combination of elements as FIG. 11 generally in an unlocked position. In this orientation, the lock surface 100 of the external lock 98 of the lock ring 44 has been mechanically moved inwardly in a radial direction and away from contact with the internal lock surface 116 of the inner curved ramp surface 114 of the closure 46. Once the external locks 98 and associated lock surfaces 100 are out of the rotational path of the internal lock surface 116, the closure 46 may be freely disengaged from the external closure thread 68 of the container 42 by manually unthreading the closure 46 in the counterclockwise direction. As soon as the closure 46 is no longer in contact with the lock ring 44, the external lock 98 will typically flex back radially outward to essentially the same position in space it maintained prior to the introduction of the closure 46 to the assembly.

Accordingly, the reader will note that the lock assembly is functionally reusable. Following its removal from the assembly 40, the closure 46 may be re-threaded back onto the external closure thread 68 of the container. In an embodiment such as that shown in FIGS. 11 and 12, the inner curved ramp surface 114 of the closure 46 will simply mechanically re-engage the external lock 98 of the lock ring 44 internal lock surface 116 once the closure 46 has been re-threaded in a clockwise direction to a sufficient extent onto the external closure threads 68.

Figure 13:
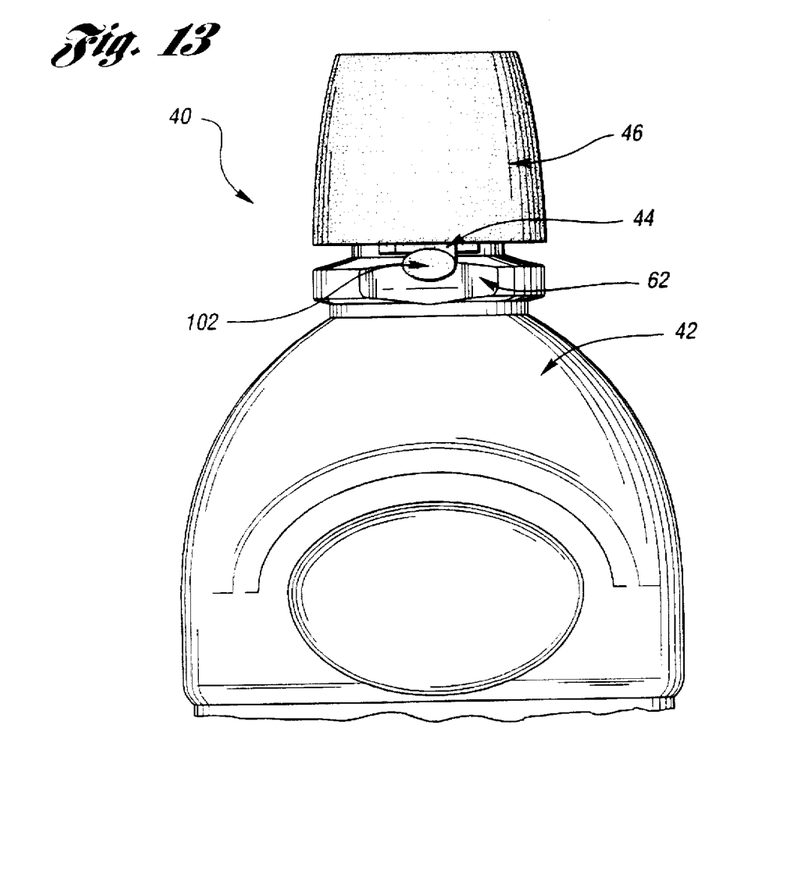
FIG. 13 is an enlarged partial front view taken in the same direction as FIG. 2 to further illustrate the container closure locking assembly.
Figure 14:
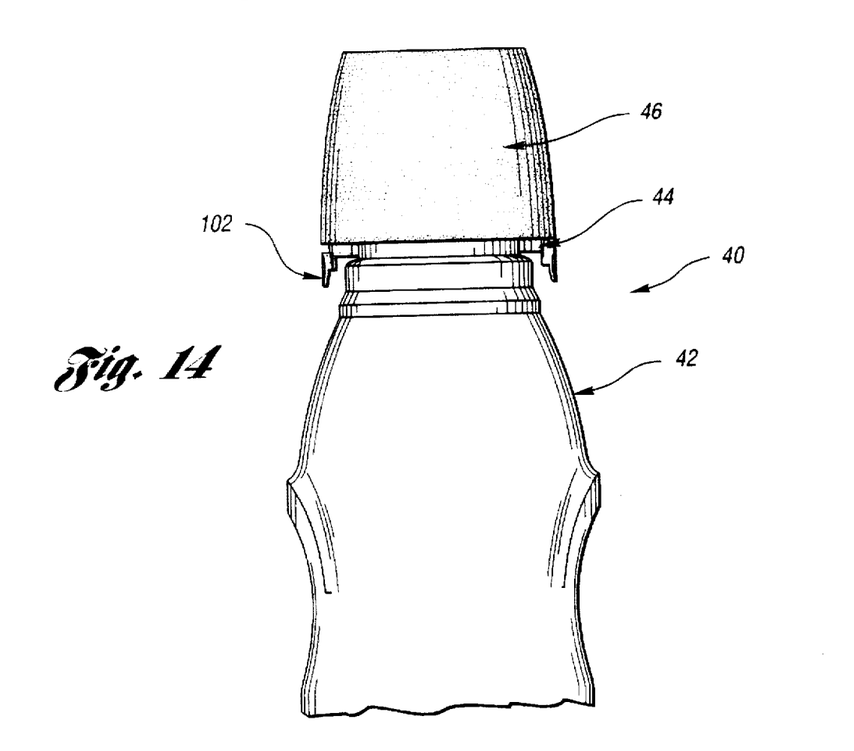
FIG. 14 an enlarged partial right side view taken in the same direction as FIG. 3 to further illustrate the container closure locking assembly.
Figure 15:
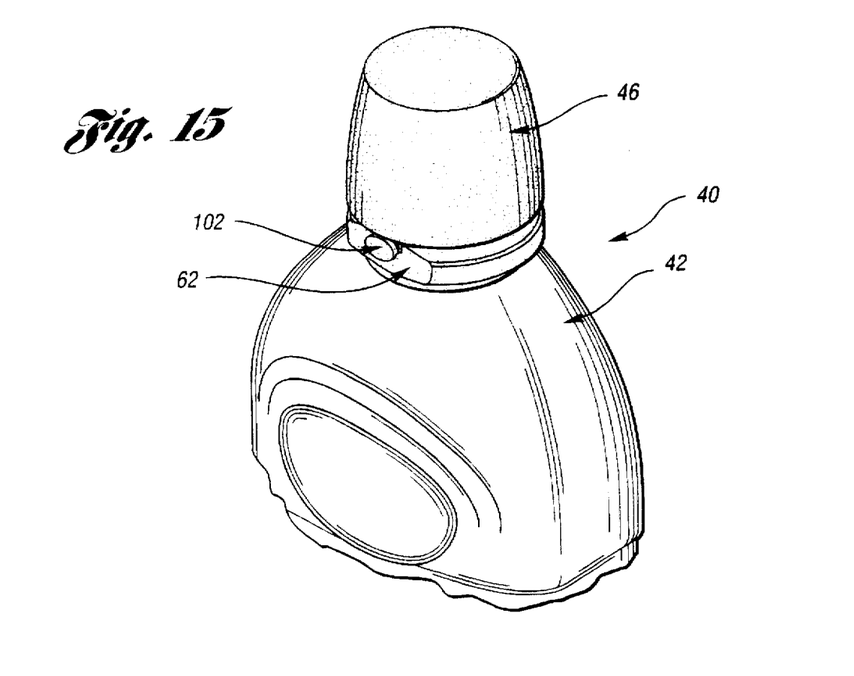
FIG. 15 is a partial perspective view of the container closure locking assembly shown in FIGS. 13 and 14.

The relationship of the fully assembled components of the invention can be viewed in FIG. 13 which depicts a partial front view of one embodiment of the container closure locking assembly 40. FIGS. 14 and 15 show fight side and perspective views, respectively, of the assembly shown in FIG. 13.

Although the above description contains many specific references to detailed information, such specificity should not be construed as limiting the scope of the invention, but as merely providing an illustration of some of the presently preferred embodiments of the invention. Obviously, numerous modifications and variations of the present invention are possible in light of the above teachings. It is therefore understood that the invention may be practiced other than as specifically described herein and the scope of the invention should be determined by the appended claims and their legal equivalents, rather than by the examples given.

What is claimed is:

1. A container closure locking assembly, comprising:

a plastic container having a body portion for holding container contents, a lower closed end for supporting the container, an upper dispensing end including a neck and a round dispensing spout having a central axis, said spout extending upwardly from the neck and including an external closure thread, and the upper dispensing end also including a retaining flange and a rotational positioning formation;

a plastic lock ring molded separately from the container and subsequently mounted and mechanically secured to the container, the plastic lock ring being positioned so as to extend around and be supported by the neck of the upper dispensing end below the external closure thread of the dispensing spout, said lock ring including retainers for engaging the retaining flange of the upper dispensing end of the container to secure the lock ring to the container, the lock ring including at least one external lock having an outer curved ramp surface of a radially ramped shape with respect to the central axis, the external lock including a lock surface that faces circumferentially with respect to the central axis, the external lock including an unlocking actuator for moving the lock surface thereof radially inward by manual movement of the unlocking acuator and the lock ring also including a rotational positioning formation that engages the rotational positioning formation of the container to rotatively position the lock ring and the lock surface thereof about the central axis; and a closure having an internal thread that is threaded onto the external thread of the dispensing spout to secure the closure and close the container, the closure having at least one internal lock having an inner curved ramp surface of a radially ramped shape with respect to the central axis, the internal lock of the closure also having a lock surface that faces circumferentially with respect to the central axis and is engaged with the lock surface of the external lock on the lock ring to prevent unthreading rotation of the closure from the dispensing spout, and the lock surface of the internal lock of the closure being disengaged from the lock surface of the external lock of the lock ring by inward manual movement of the unlocking actuator to permit unthreading rotation of the closure.

2. The container closure locking assembly of claim 1, wherein the container is blow molded from an injection molded plastic preform.

3. The container closure locking assembly of claim 1, wherein the container is molded from an extruded plastic parison.

4. The container closure locking assembly of claim 1, wherein the lock ring is injection molded.

5. The container closure locking assembly of claim 1, wherein the lock ring is compression molded.

6. The container closure locking assembly of claim 1, wherein the retainers of the lock ring project radially inward and engage the retaining flange of the upper dispensing end of the container so as to generally prevent movement of the lock ring in the direction of the central axis of the dispensing spout.

7. The container closure locking assembly of claim 6, wherein the retaining flange includes an outer radial surface at least a portion of which is inclined inwardly relative to the central axis of the dispensing spout.

8. The container closure locking assembly of claim 7, wherein the outer radial surface is inclined inwardly in an upward direction.

9. The container closure locking assembly of claim 7, wherein the retaining flange has at least one upper flange step.

10. The container closure locking assembly of claim 9, wherein the outer radial portion of the upper flange step is inclined inwardly in an upward direction.

11. The container closure locking assembly of claim 6, wherein the retainers of the lock ring include upper retainers and lower retainers.

12. The container closure locking assembly of claim 11, wherein the lower retainers include a lower edge.

13. The container closure locking assembly of claim 12, wherein the lower surface of the lower retainers are inclined inwardly in a downwardly direction to facilitate assembly of the lower retainers below the retaining flange.

14. The container closure locking assembly of claim 11, wherein the lower retainers include an upper surface.

15. The container closure locking assembly of claim 14, wherein the upper surface of the lower retainers retainers generally extend in a substantially perpendicular direction with respect to the central axis of the dispensing spout.

16. The container closure locking assembly of claim 11, wherein the upper retainers are generally staggered circumferentially about the central axis with respect to the lower retainers.

17. The container closure locking assembly of claim 11, wherein the lower retainers are formed by a secondary process after the upper retainers have been formed.

18. The container closure locking assembly of claim 11, wherein the upper retainers prevent the lock ring from being improperly assembled to the retaining flange when the lock ring is positioned upside down.

19. The container closure locking assembly of claim 6, wherein the lock ring includes two generally diametrically opposed rotational positioning formations and the retaining flange includes two generally diametrically opposed rotational positioning formations to engage the rotational positioning formations of the lock ring.

20. The container closure locking assembly of claim 6, wherein the rotational positioning formation of the upper dispensing end of the container includes at least one notch and wherein the rotational positioning formation of the lock ring protrudes inwardly and is received within said notch.

21. The container closure locking assembly of claim 20, wherein the rotational positioning formation of the upper dispensing end of the container comprises two notches and the lock ring includes two inwardly protruding formations received within said notches.

22. The container closure locking assembly of claim 6, wherein the lock ring includes two generally diametrically opposed unlocking actuators to mechanically position two external locks and the closure includes two internal locks for engaging said external locks.

23. The container closure locking assembly of claim 22, wherein the outer radial surface of the unlocking actuators is textured.

24. The container closure locking assembly of claim 6, wherein the lock ring is circumferentially positioned about the central axis so that the closure may be substantially threaded onto the external closure thread of the upper dispensing end of the container before the lock surface of the external locks of the lock ring mechanically engage the internal lock surface of the internal locks of the closure.

25. The container closure locking assembly of claim 6, wherein the neck of the container includes at least one indentation located radially inward with respect to the central axis from the assembled position of the unlocking actuator.

26. A container closure locking assembly, comprising:

a plastic container blow molded from an injection molded plastic preform having a body portion for holding container contents, a lower closed end for supporting the container, an upper dispensing end including a neck and a round dispensing spout having a central axis, said spout extending upwardly from the neck and including an external closure thread, and the upper dispensing end also including a retaining flange and a rotational positioning formation;

a plastic lock ring injection molded separately from the container and subsequently mounted and mechanically secured to the container, the plastic lock ring being positioned so as to extend around and be supported by the neck of the upper dispensing end below the external closure thread of the dispensing spout, said lock ring including retainers projecting radially inwardly for engaging the retaining flange of the upper dispensing end of the container to secure the lock ring to the container and generally prevent movement of the lock ring in the direction of the central axis of the dispensing spout, the lock ring including at least one external lock having an outer curved ramp surface of a radially ramped shape with respect to the central axis, the external lock including a lock surface that faces circumferentially with respect to the central axis, the external lock including an unlocking actuator for moving the lock surface thereof radially inward by manual movement of the unlocking acuator and the lock ring also including a rotational positioning formation that engages the rotational positioning formation of the container to rotatively position the lock ring and the lock surface thereof about the central axis; and a closure having an internal thread that is threaded onto the external thread of the dispensing spout to secure the closure and close the container, the closure having at least one internal lock having an inner curved ramp surface of a radially ramped shape with respect to the central axis, the internal lock of the closure also having a lock surface that faces circumferentially with respect to the central axis and is engaged with the lock surface of the external lock on the lock ring to prevent unthreading rotation of the closure from the dispensing spout, and the lock surface of the internal lock of the closure being disengaged from the lock surface of the external lock of the lock ring by inward manual movement of the unlocking actuator to permit unthreading rotation of the closure.

27. A container closure locking assembly, comprising:

a plastic container molded from an extruded parison having a body portion for holding container contents, a lower closed end for supporting the container, an upper dispensing end including a neck and a round dispensing spout having a central axis, said spout extending upwardly from the neck and including an external closure thread, and the upper dispersing end also including a retaining flange and a rotational positioning formation;

a plastic lock ring injection molded separately from the container and subsequently mounted and mechanically secured to the container, the plastic lock ring being positioned so as to extend around and be supported by the neck of the upper dispensing end below the external closure thread of the dispensing spout, said lock ring including upper retainers and lower retainers projecting radially inwardly for engaging the retaining flange of the upper dispensing end of the container to secure the lock ring to the container and generally prevent movement of the lock ring in the direction of the central axis of the dispensing spout, the lock ring including at least one external lock having an outer curved ramp surface of a radially ramped shape with respect to the central axis, the external lock including a lock surface that faces circumferentially with respect to the central axis, the external lock including an unlocking actuator for moving the lock surface thereof radially inward by manual movement of the unlocking acuator and the lock ring also including a rotational positioning formation that engages the rotational positioning formation of the container to rotatively position the lock ring and the lock surface thereof about the central axis; and a closure having an internal thread that is threaded onto the external thread of the dispensing spout to secure the closure and close the container, the closure having at least one internal lock having an inner curved ramp surface of a radially ramped shape with respect to the central axis, the internal lock of the closure also having a lock surface that faces circumferentially with respect to the central axis and is engaged with the lock surface of the external lock on the lock ring to prevent unthreading rotation of the closure from the dispensing spout, and the lock surface of the internal lock of the closure being disengaged from the lock surface of the external lock of the lock ring by inward manual movement of the unlocking actuator to permit unthreading rotation of the closure.

* * * * *